(12) United States Patent
Exby

(10) Patent No.: US 6,763,632 B1
(45) Date of Patent: Jul. 20, 2004

(54) POCKET FISHING LURE HOLDER

(76) Inventor: James A. Exby, 6507 Marbletree La., Lake Worth, FL (US) 33467

( * ) Notice: Subject to any disclaimer, the term of this patent is extended or adjusted under 35 U.S.C. 154(b) by 0 days.

(21) Appl. No.: 10/387,689

(22) Filed: Mar. 13, 2003

(51) Int. Cl.[7] .............................................. A01K 97/06
(52) U.S. Cl. ........................................ 43/57.1; 43/54.1
(58) Field of Search ................................. 43/57.1, 54.1, 43/4; 206/315.11, 579; 224/920, 221, 230, 183; D22/149, 199; 40/1.5, 666; D11/95

(56) References Cited

U.S. PATENT DOCUMENTS

| | | | |
|---|---|---|---|
| 206,206 A | * | 7/1878 | Yerrinton ..................... 43/57.1 |
| 891,055 A | | 6/1908 | Frost |
| 915,557 A | | 3/1909 | Cooper |
| 1,214,282 A | * | 1/1917 | Day ............................ 224/572 |
| 2,285,670 A | * | 6/1942 | Logsdon ....................... 24/3.5 |
| 2,625,261 A | | 1/1953 | Swift |
| 2,978,830 A | * | 4/1961 | Killian ........................ 43/57.1 |
| 3,295,235 A | * | 1/1967 | Tauber ......................... 40/1.5 |
| 3,371,829 A | * | 3/1968 | Phillips ....................... 224/230 |
| 3,747,258 A | * | 7/1973 | Maciel ......................... 43/57.1 |
| 3,797,717 A | * | 3/1974 | Collins ........................ 224/231 |
| 3,830,415 A | * | 8/1974 | Jacobson et al. ........... 224/230 |
| 3,940,873 A | * | 3/1976 | Lawless ....................... 43/57.1 |
| 4,467,551 A | | 8/1984 | Pulver |
| 4,703,581 A | | 11/1987 | Whittier |
| 4,937,963 A | * | 7/1990 | Barnes ..................... 40/661.06 |
| 4,970,821 A | | 11/1990 | Young |
| 5,020,269 A | | 6/1991 | Gentry et al. |
| 5,555,671 A | * | 9/1996 | Voight et al. ................ 43/57.1 |
| 5,806,236 A | | 9/1998 | Lloyd |
| 5,864,925 A | * | 2/1999 | McGee ......................... 24/3.11 |
| D444,947 S | | 7/2001 | Nelson |

* cited by examiner

Primary Examiner—Peter M. Poon
Assistant Examiner—Joan M. Olszewski
(74) Attorney, Agent, or Firm—Mark D. Bowen, Esq.; Stearns Weaver Miller; Weissler Alhadeff & Sitterson, P.A.

(57) ABSTRACT

A holder adapted for removable insertion within a pocket for holding a number of artificial fishing lures and accessories in a secure yet readily accessible location. The holder includes: a rectangular front panel of nominal thickness having layer of foam-like material connected thereto for providing a surface upon which fishing lures may be affixed; and a rear panel comprising a double wall, transparent member having an opening to allow for removable placement of sheet material therein, such as a fishing license, instructional material, advertising, etc. The lower edge of the rear panel includes a gripping structure for securing the device inserted within a shirt pocket.

7 Claims, 4 Drawing Sheets

US 6,763,632 B1

POCKET FISHING LURE HOLDER

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

This invention relates to fishing accessories, and, more particularly to an apparatus for removable storage of fishing lures, tackle, flies, and accessories while fishing.

2. Description of the Background Art

Recreational and sport fishermen are known to use a wide variety of artificial lures, baits, and tackle while fishing. The use of artificial lures has increased largely as a result of the great variety of different lures available. In addition, new lures, artificial baits, and tackle are constantly being developed to satisfy the demands and preferences of fishermen.

While artificial lures are widely popular, uses of such lures are plagued by disadvantages. Fishermen oftentimes use a large number of lures in a relatively short period of time—often changing lures for various reasons while attempting to improve the odds at catching fish. A primary disadvantage associated with the use of artificial fishing lures relates to storing lures while not in use in a manner that makes the lures readily accessible for use. While artificial lures may be stored in tackle boxes such a storage solution does not provide the fisherman with convenient access to the lures at all times. In addition, tackle boxes are often stuffed full of various fishing accessories making the selection and removal of an individual desired lure difficult and time consuming as fishing lines, lures, and tackle often become entangled and/or hard to find.

In response to such problems, the background art reveals a number of devices designed to function as fishing lure holders. The following patents provide examples of these proposals.

| | | | |
|---|---|---|---|
| 891,055 | Frost | 4,970,821 | Young |
| 915,557 | Cooper | 5,020,269 | Gentry |
| 2,625,261 | Swift | 5,806,236 | Lloyd |
| 4,467,551 | Pulver | D444,947 | Nelson |
| 4,703,581 | Whittier | | |

U.S. Pat. No. 891,055, issued to Frost, discloses a provides a compact fly-book or bait-carrier wherein the flies or bait will be protected, kept moist if desired, and readily accessible for inspection and use.

U.S. Pat. No. 915,557, issued to Cooper, discloses envelopes adapted for holding fishing tackle or appliances such as artificial flies in a transparent section. The flies are confined in place and protected, while remaining in full view through the transparent section in order to afford ready selection.

U.S. Pat. No. 2,625,261, issued to Swift, discloses a fly book having separate compartments for storage of groups of flies of different types, to provide for visual identification and selection of the flies of each type, and to provide protection against damage to the flies. The invention is comprised of a panel of sheet material having slots, a series of staggered overlapping pockets of substantially equal depth secured to the material between the slots, an envelope in each pocket for storage of flies, the height of envelopes being substantially equal to depth of pockets, and a tab projecting from upper edge of each envelope and extending out of the respective pockets. The tab is transparent and defines a receptacle adapted to contain visual identification for the flies.

U.S. Pat. No. 4,467,551, issued to Pulver, discloses a fishing lure storage apparatus having an elongated base section, and a plurality of separate cover section disposed over one side of the base section. The cover sections are arranged adjacent to and overlapping each other along substantially the full length of the base section with exception of an exposed portion at one end of the base section.

U.S. Pat. No. 4,703,581, issued to Whittier, discloses a rectangular shaped foldable fishing lure case of nominal thickness for carrying and storing fishing lures. The device has an external backing material forming the exterior surface of the case. An internal surface material (14) is affixed to the external backing material, and is capable of being easily pierced by fishing hooks affixed to lures to hold such hooks in piercing engagement within the case until manually removed.

U.S. Pat. No. 4,970,821, issued to Young, discloses a combination storage and display fishing tackle wrapper. The device comprises a fabric holder for small items including fishing lures, hooks and other fishing paraphernalia used to either store the fishing tackle or display it in an easily accessible mode. The tackle wrapper is made from a fabric sheet having two long side edges and a top and bottom edge. VELCRO type hook and loop materials are attached to a front surface of the fabric sheet in multiple thin rows (about one inch wide) from the top to the bottom edge. A strap with two rings is attached along a back surface of the fabric sheet adjacent the top edge and is allowed to hang down below the lower edge.

U.S. Pat. No. 5,020,269, issued to Gentry, discloses a device for storing and organizing fishing baits and lures which includes a flat backing member having a first attachment member and a plurality of storage bags arranged in discrete groups. Each group has a second attachment member for securing the bags of each group together and for attaching the corresponding group to the backing member. The bags have flaps with the respective mouths being at the free ends of the flaps. The bags of each group are in a staggered, overlapping manner so that all but the lowermost group partially overlap the groups below.

U.S. Pat. No. 5,806,236, issued to Lloyd, discloses a compact foldable fishing lure packet having a flexible backing with two folds, three formed backing sections, and two lure overlapping flaps in two of the sections. Separate engaging hook and loops or hook and pile strips extend across the width of the two flapped sections and are used to retain the eye or unhooked end of a lure inserted between them.

While the devices disclosed in the background art appear adequate for the basic purposes for which they have been specifically designed, they fail to provide a pocket fishing lure and license holder that fits neatly within the breast pocket of a shirt and is adapted with a first portion designed to hold artificial fishing lures and a second portion adapted to hold the user's fishing license in a transparent plastic compartment. As a result of the shortcomings of the background art, there exists a need for a new and improved fishing lure holder.

BRIEF SUMMARY OF THE INVENTION

The present invention provides a compact fishing lure and accessory holder adapted for removable insertion within the users shirt pocket for holding a number of artificial fishing lures in a secure yet readily accessible location on the user's person. A pocket fishing lure holder according to the present invention preferably includes a rectangular front panel of nominal thickness having layer of foam-like material connected thereto for providing a surface upon which fishing lures may be affixed. The device further includes a rear panel connected to the front panel along the corresponding top peripheral edges of said panels thereby generally forming a A-shaped configuration. The rear panel comprises double wall, transparent member having an opening to allow for removable placement of sheet material therein, such as a fishing license, instructional material, advertising, etc. The lower edge of the rear panel preferably includes a gripping structure or tacky material for securing the device inserted within a front breast shirt pocket. The device may further include a pair of loops and/or an automatically retracting reel for holding useful hand tools, such as pliers or clippers.

Accordingly, it is an object of the present invention to provide an improved fishing lure holder.

Yet another object of the present invention is to provide a pocket fishing lure holder for holding fishing lures, fishing flies, and accessories.

Still further objects and advantages will become apparent from a consideration of the ensuing description and drawings.

DETAILED DESCRIPTION OF THE INVENTION

Figure 1:
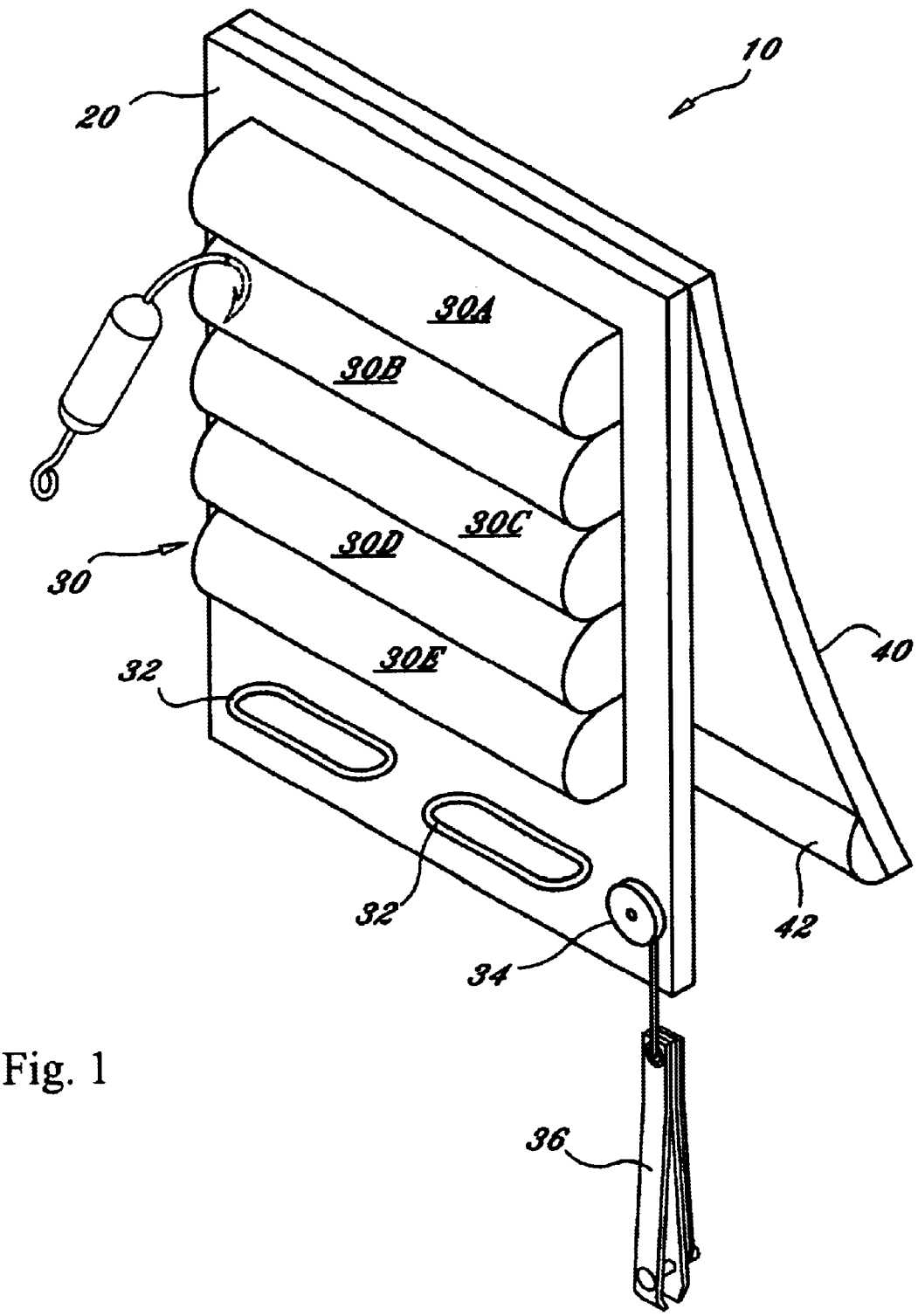
FIG. 1 is front perspective view of a fishing lure holder according to the present invention.

FIGS. 1–4 depict a pocket fishing lure holder, generally referenced as 10, according to the present invention. Fishing lure holder 10 comprises a compact fishing lure and accessory holder adapted to be worn by the user by attachment to the user's shirt pocket for holding a number of artificial fishing lures in a secure yet readily accessible location on the user's person. Fishing lure holder 10 preferably includes a rectangular front panel 20 of nominal thickness having pad of foam-like material, generally referenced as 30, connected thereto, and a rear panel 40. Material 30 is preferably a foam or sponge-like material suitable for holding fishing lures by removable piercing of the material by fishing hooks and thus providing a surface upon which fishing lures may be affixed while remaining readily accessible to the user. In a preferred embodiment material 30 is configured with a plurality of horizontally disposed, vertically stacked, convex protruding surfaces, referenced as 30A–30E, which configuration significantly enhances the ease of removal and replacement of individual fishing lures by providing projecting rounded surfaces suitable for easy attachment and removal. Material 30 is preferably affixed to front panel 20 via hook and loop fastening material thereby allowing the user to remove an entire pad of foam 30 and replace the pad with a substitute having a variety of different fishing lures thereon. In an alternate embodiment, material 30 may be permanently affixed to front panel 20.

In an alternate embodiment, front panel 20 may further include structure for removably holding hand tools and accessories. More particularly, a pair of horizontally disposed loops, referenced as 32, or alternatively as holes, may be disposed in connection with front panel 20 thereby providing structure for holding a pair of pliers by insertion of the handles therein. In addition, the present invention contemplates the incorporation of reel 34 capable of manual extension and automatic, spring-loaded retraction for holding a useful tool 36, such as a clipping tool (e.g. fingernail clippers) for use in clipping off excess fishing line.

Figure 2:
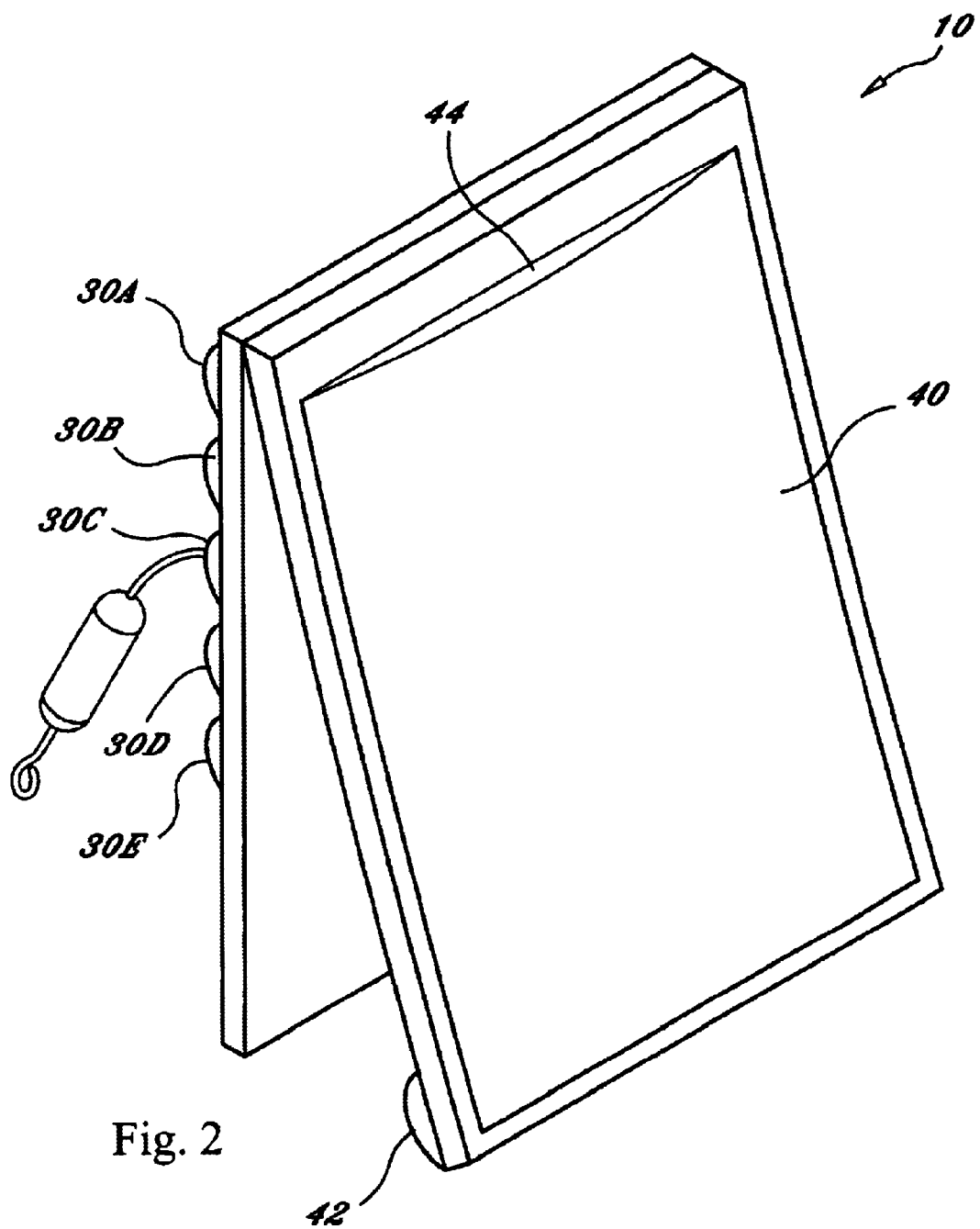
FIG. 2 is a rear perspective view thereof.
Figure 3:
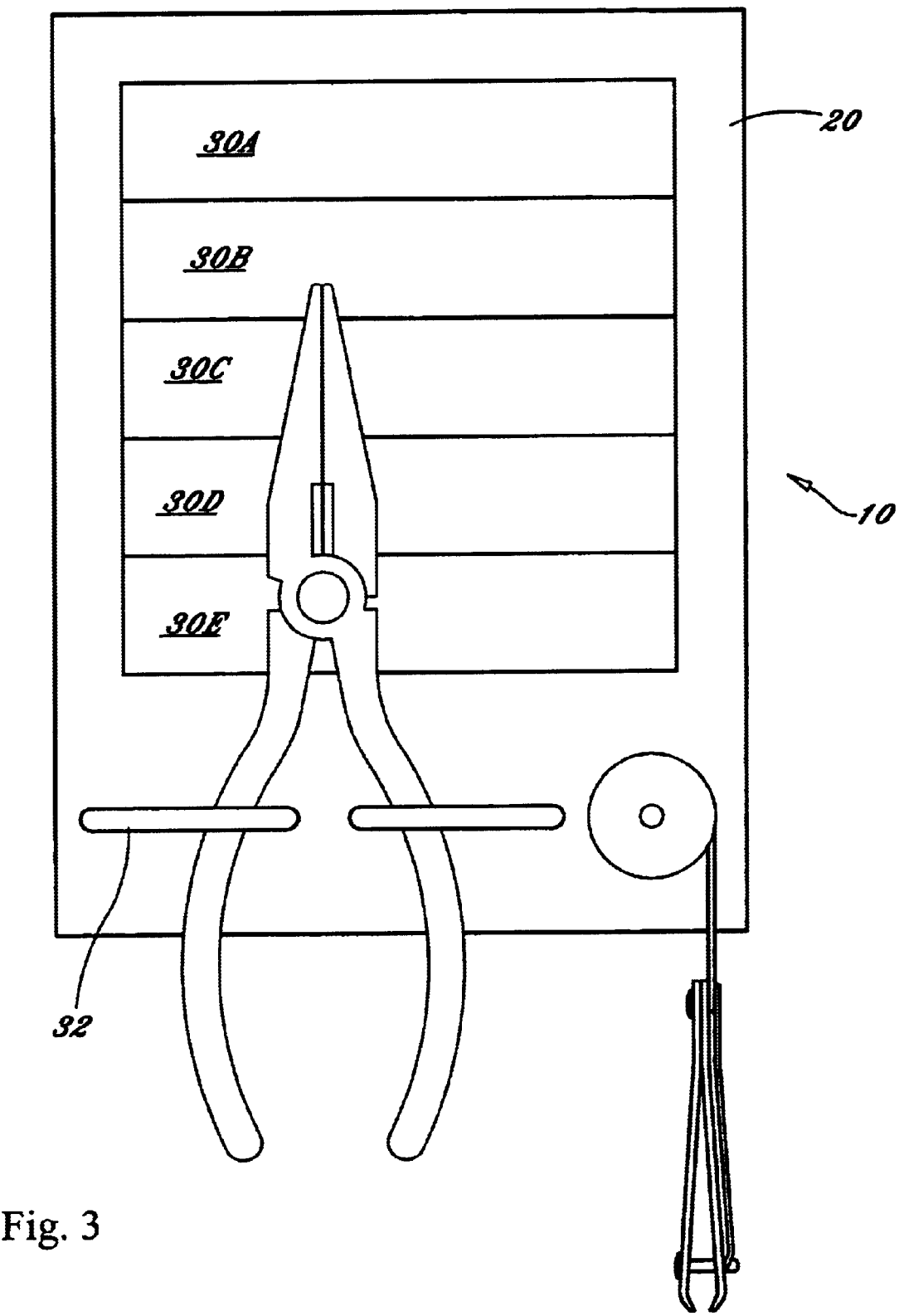
FIG. 3 is a front view thereof with hand tool accessories.
Figure 4:
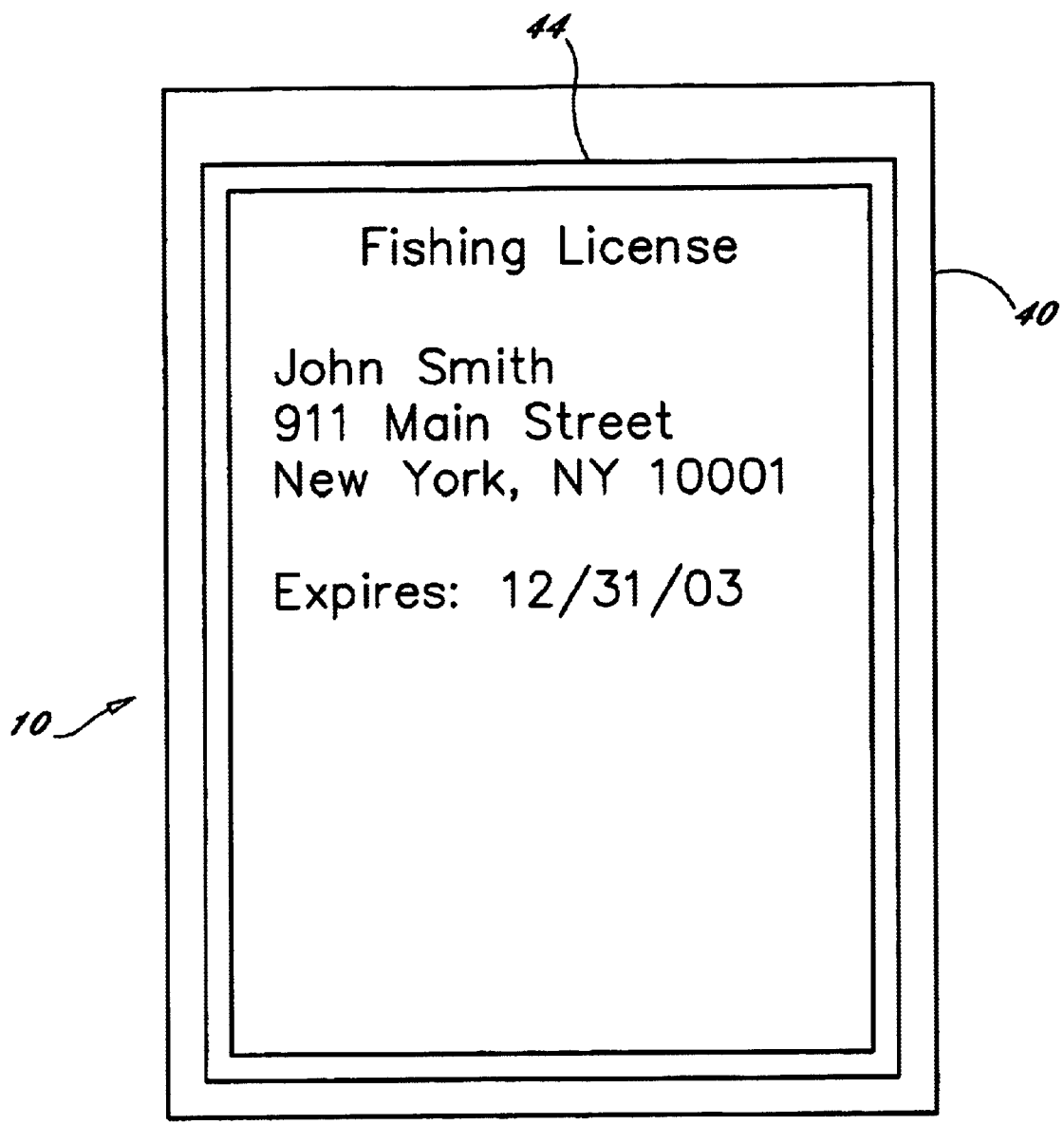
FIG. 4 is a rear view thereof with a fishing license inserted therein.

Rear panel 40 is connected to front panel 20 along the corresponding top peripheral edges of said panels thereby generally forming an A-shaped configuration wherein rear panel 40 is insertably received within the user's shirt pocket. As depicted in FIGS. 2 and 3, rear panel 40 preferably comprises double wall member defining a pocket having a transparent rear portion accessed by an opening 44 to allow for removable placement of sheet material therein, such as a fishing license, instructional material, advertising, etc. In an alternate embodiment, rear panel 40 may be a solid sheet with no pocket. In addition, the lower edge of rear panel 40 preferably includes a gripping structure 42, such as a rubber or tacky material, for securing the device inserted within a front breast shirt pocket. As best depicted in FIG. 1, gripping structure 42 is disposed on the inside surface of panel 40 so as to be disposed between panel 40 and panel 20 when the device is not in use. Gripping structure 42 functions to secure the device relative to the user when in use by preventing panel 40 from sliding out of the user's pocket while adding or removing fishing lures.

Fishing lure holder 10 may be alternately configured from a single sheet of material folded into a modified "N" shape. More particularly, a single sheet may be folded in two locations (similar to an "N" shape) so as to form a front panel (first leg of the "N"), a rear panel (diagonal portion of the "N"), and a pocket formed by folding a portion of the material back over the rear panel (shortened second leg of the "N").

Fishing lure holder 10 may be used by attaching holder 10 to a shirt pocket by insertion of rear panel 40 into the pocket, while the front panel 20 is disposed outside the pocket, whereby lure holder 10 is held in place by frictional engagement of gripping structure 42 with the shirt pocket fabric. A plurality of fishing lures may be removably affixed to holder 10 by piercing the foam-like material 30 with the lure hooks such that the lures dangle from the holder within easy reach of the user. As noted hereinabove, panels 30 are removable and replaceable such that the user may organize selected lures for use in specific fishing activities such as fresh water fishing and salt water fishing and/or selected lures for specific types of fish such as bass, snapper, bone fish etc. The pads of foam material may be conveniently stored in a tackle box and may be removably affixed to front panel 20 with hook and loop fastening material.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A fishing lure holder adapted for being carried by a person inserted within a pocket of an article of clothing, said fishing lure holder comprising:

a front panel member and a rear panel member, each panel member having an outer surface and an inner surface and top and bottom peripheral edges, said front and rear panel members each connected proximate said top peripheral edge portions thereof;

said front panel having at least one pad of foam material affixed to said outer surface thereof for removably holding fishing lures by pierced engagement with fishing hooks;

said rear panel having a gripping structure disposed proximal the lower edge thereof for engaging fabric forming the pocket of an article of clothing;

said rear panel further defining a pocket for receiving sheet like material, said pocket having a transparent outer wall.

2. A fishing lure holder according to claim 1, wherein said pad of foam material is removably attached to said outer surface of said front panel member by hook and loop fastening material.

3. A fishing lure holder according to claim 1, wherein said pad of foam material defines at least one arcuate surface.

4. A fishing lure holder according to claim 3 wherein said pad of foam material defines a plurality of arcuate surfaces.

5. A fishing lure holder adapted for being carried by a person inserted within a pocket of an article of clothing, said fishing lure holder comprising:

a front panel member and a rear panel member, each panel member having an outer surface and an inner surface and top and bottom peripheral edges, said front and rear panel members each connected proximate said top peripheral,edge portions thereof;

said front panel having at lease one pad of foam material removably affixed to said outer surface thereof by hook and loop fastening material for removably holding fishing lures by pierced engagement with fishing hooks, said pad of foam material defining a plurality of semi-cylindrical arcuate surfaces in a horizontally disposed vertically stacked configuration;

said rear panel having tacky material for engaging fabric forming the pocket of an article of clothing;

said rear panel further defining a pocket for receiving sheet like material, said pocket having a transparent outer wall.

6. A fishing lure holder according to claim 5, wherein said front panel outer surface further includes means for removably holding a pair of pliers.

7. A fishing lure holder according to claim 5, further including a clipping tool connected to said front panel member by a retractable cable.

* * * * *